(12) United States Patent
Compton et al.

(10) Patent No.: US 9,766,071 B2
(45) Date of Patent: Sep. 19, 2017

(54) DIVERGING WAVEGUIDE ATOMIC GYROSCOPE

(71) Applicant: Honeywell International Inc., Morristown, NJ (US)

(72) Inventors: Robert Compton, Plymouth, MN (US); Karl D. Nelson, Plymouth, MN (US); Chad Fertig, Bloomington, MN (US)

(73) Assignee: Honeywell International Inc., Morris Plains, NJ (US)

( * ) Notice: Subject to any disclaimer, the term of this patent is extended or adjusted under 35 U.S.C. 154(b) by 211 days.

(21) Appl. No.: 14/717,782

(22) Filed: May 20, 2015

(65) Prior Publication Data

US 2016/0377436 A1     Dec. 29, 2016

Related U.S. Application Data

(60) Provisional application No. 62/107,106, filed on Jan. 23, 2015.

(51) Int. Cl.
    *G01C 19/72*     (2006.01)
    *G01C 19/60*     (2006.01)
    *G01C 19/64*     (2006.01)

(52) U.S. Cl.
    CPC ........... *G01C 19/723* (2013.01); *G01C 19/60* (2013.01); *G01C 19/64* (2013.01); *G01C 19/721* (2013.01)

(58) Field of Classification Search
    CPC .............................. G01C 19/64; G01C 19/723
    See application file for complete search history.

(56) References Cited

U.S. PATENT DOCUMENTS

| | | |
|---|---|---|
| 5,085,501 A | 2/1992 | Sakuma et al. |
| 7,030,370 B1 | 4/2006 | Crookston et al. |

(Continued)

OTHER PUBLICATIONS

European Patent Office, "Communication under Rule 71(3) EPC, from EP Application No. 16151394.0, mailed Feb. 1, 2017", "from Foreign Counterpart of U.S. Appl. No. 14/717,782", Feb. 1, 2017, pp. 1-45.

(Continued)

*Primary Examiner* — Kara E Geisel
*Assistant Examiner* — Violeta A Prieto
(74) *Attorney, Agent, or Firm* — Fogg & Powers LLC

(57) ABSTRACT

Waveguide includes fork with first and second bifurcated ends coupled to loop section and separated by angle determined based on velocities of portions of quantum mechanical wavefunction of atoms traveling above waveguide. Waveguide propagates blue-detuned laser having first evanescent field that repels atoms away from waveguide and red-detuned laser having second evanescent field that attracts atoms toward waveguide, together creating potential minimum/well. Laser cooling atoms, causing atoms positioned in potential minimum/well to move toward first fork section following potential minimum/well. Atomic state initialization section initializes atomic states of atoms to known ground-state configuration. Beam splitter section splits quantum mechanical waveform of each atom above surface of diverging waveguide into first portion at first velocity that travels into first end of first fork section into first loop section and second portion at second velocity that travels into second end of first fork section into first loop section.

14 Claims, 5 Drawing Sheets

(56) References Cited

U.S. PATENT DOCUMENTS

Figure 1:
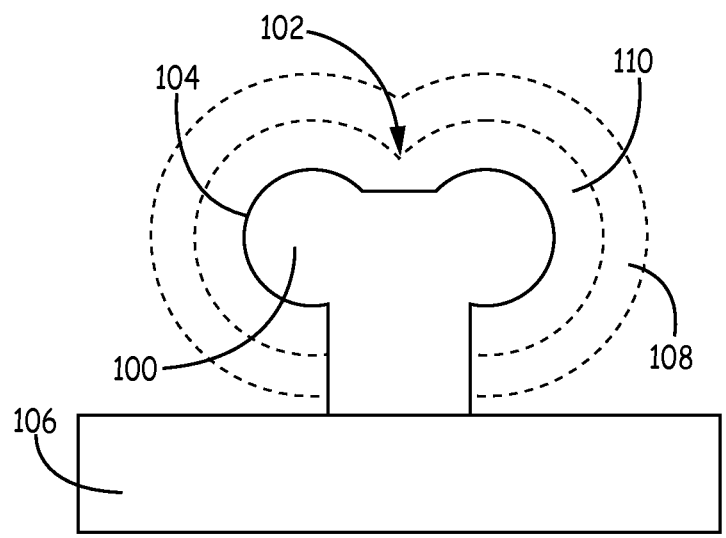

| | | | |
|---|---|---|---|
| 7,872,473 B2 | 1/2011 | Kitching et al. | |
| 9,175,960 B1* | 11/2015 | Compton | G01C 19/58 |
| 2005/0199871 A1* | 9/2005 | Anderson | G21K 1/006 257/14 |
| 2009/0219545 A1* | 9/2009 | Feth | G01C 19/721 356/460 |
| 2010/0135610 A1* | 6/2010 | Feth | G02B 6/1342 385/14 |
| 2010/0200739 A1* | 8/2010 | Anderson | G21K 1/006 250/251 |
| 2014/0361768 A1 | 12/2014 | Overstreet, II et al. | |

OTHER PUBLICATIONS

European Patent Office, "Extended European Search Report from EP Application No. 16151394.0 mailed Jun. 17, 2016", "from Foreign Counterpart of U.S. Appl. No. 14/717,782", Jun. 17, 2016, Published in: EP.

Bongs et al., "Physics with coherent matter waves", "Reports on Progress in Physics6", Jun. 1, 2004, pp. 907-963, vol. 67, No. 6, Publisher: Institute of Physics Publishing, Published in: UK.

Muller et al., "A compact dual atom interferometer gyroscope based on laser-cooled rubidium", May 1, 2009, pp. 273-281, vol. 53, No. 3, Publisher: The European Physical Journal D: Atoms, Molecules, Clusters Andoptical Physics.

Renn et al., "Evanescent-wave guiding of atoms in hollow optical fibers", Feb. 1, 1996, pp. R648-R651, vol. 53, No. 2, Publisher: Physical Review A.

Barrett et al., "Mobile and remote inertial sensing with atom interferometers", "Societa Italiana di Fisicia", Aug. 13, 2014, pp. 1-63.

Fang et al., "Advances in Atomic Gyroscopes: A View from Inertial Navigation Applications", "Sensors 2012", May 11, 2012, pp. 6331-6346.

Helm, "Soliton dynamics in the Gross-Pitaevskii equation: splitting, collisions and interferometry", "Durham University Department of Physics", Mar. 2014, pp. 1-126.

Kitching et al., "Atomic Sensors—A Review", "IEEE Sensors Journal", Sep. 2011, pp. 1749-1758, vol. 11, No. 9.

Muller et al., "A waveguide atom beamsplitter for laser-coded neutral atoms", Feb. 2, 2008, pp. 1-12.

Muller et al., "A waveguide atom beamsplitter for laser-coded neutral atoms", Jul. 13, 2011, pp. 1-12.

Van Camp et al., "Towards a High-Precision Atomic Gyroscope", May 30, 2013, pp. 1-72, Publisher: Massachusettes Institute of Technology, Published in: US.

Wu et al., "Bidirectional propagation of cold atoms in a 'stadium' shaped magnetic guide", Jul. 19, 2014, pp. 1-19.

Segal, "Progress towards an ultracold atomic Sagnac gyroscope", at least as early as Jun. 16, 2010, pp. 1-161, downloaded from: https://jila.colorado.edu/sites/default/files/assets/files/publications/segal_thesis.pdf.

\* cited by examiner

DIVERGING WAVEGUIDE ATOMIC GYROSCOPE

CROSS-REFERENCE TO RELATED APPLICATIONS

This application claims the benefit of U.S. Provisional Patent Application Ser. No. 62/107,106 filed on Jan. 23, 2015, which is hereby incorporated herein by reference.

BACKGROUND

Atomic gyroscopes are navigation instruments used to measure rotation rates about an axis of rotation. Utilizing the Sagnac effect, a shift in phase of an atomic wavefunction is calculated. The rotation rate of the gyroscope is proportional to the phase shift of the atomic wavefunction.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 1 is a cross sectional diagram showing a waveguide having a waveguide potential energy minimum for atoms above the waveguide surface.

Figure 2A:
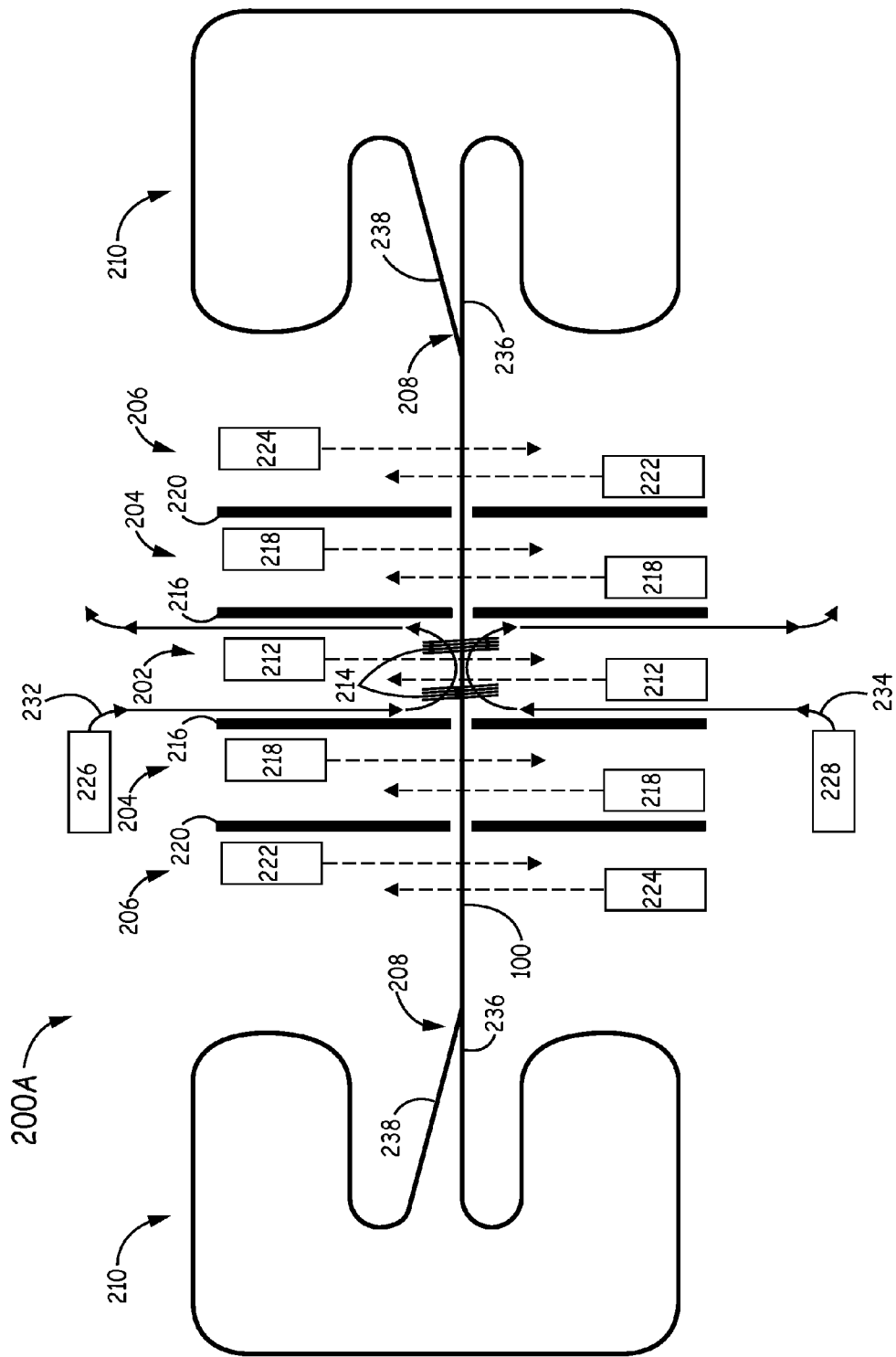
Figure 2B:
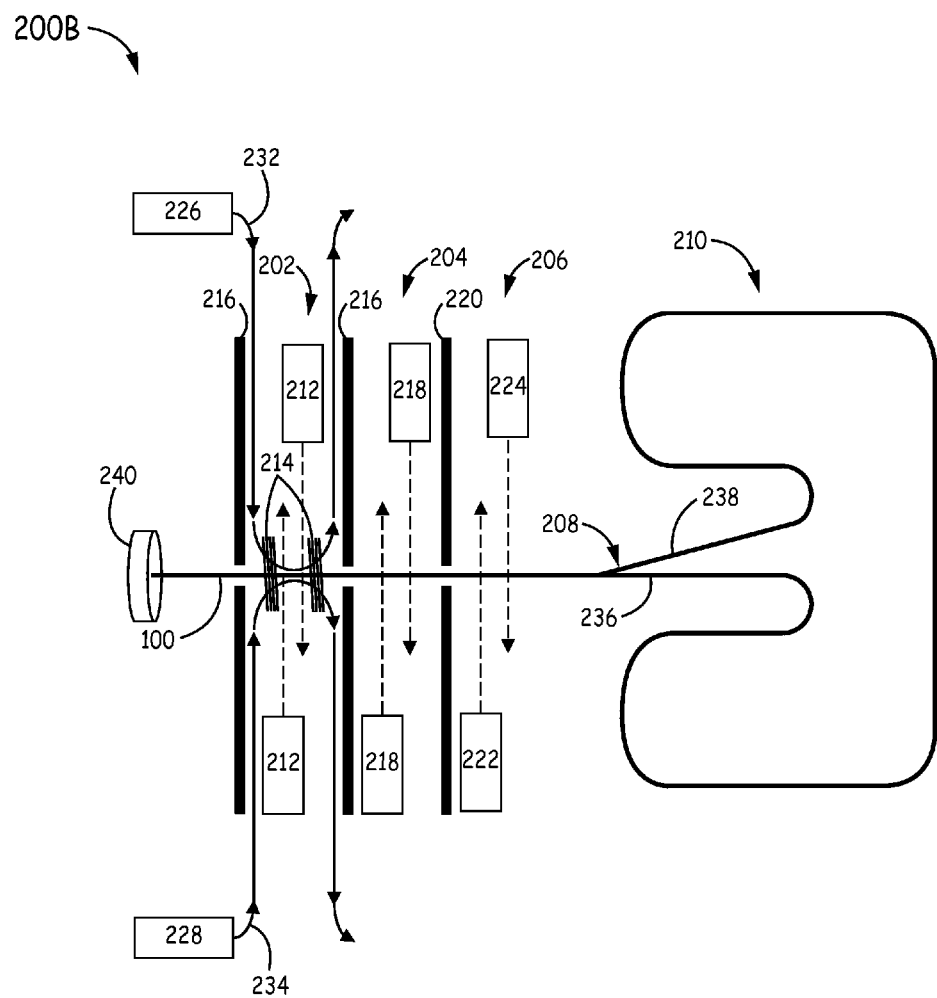
Figure 2C:
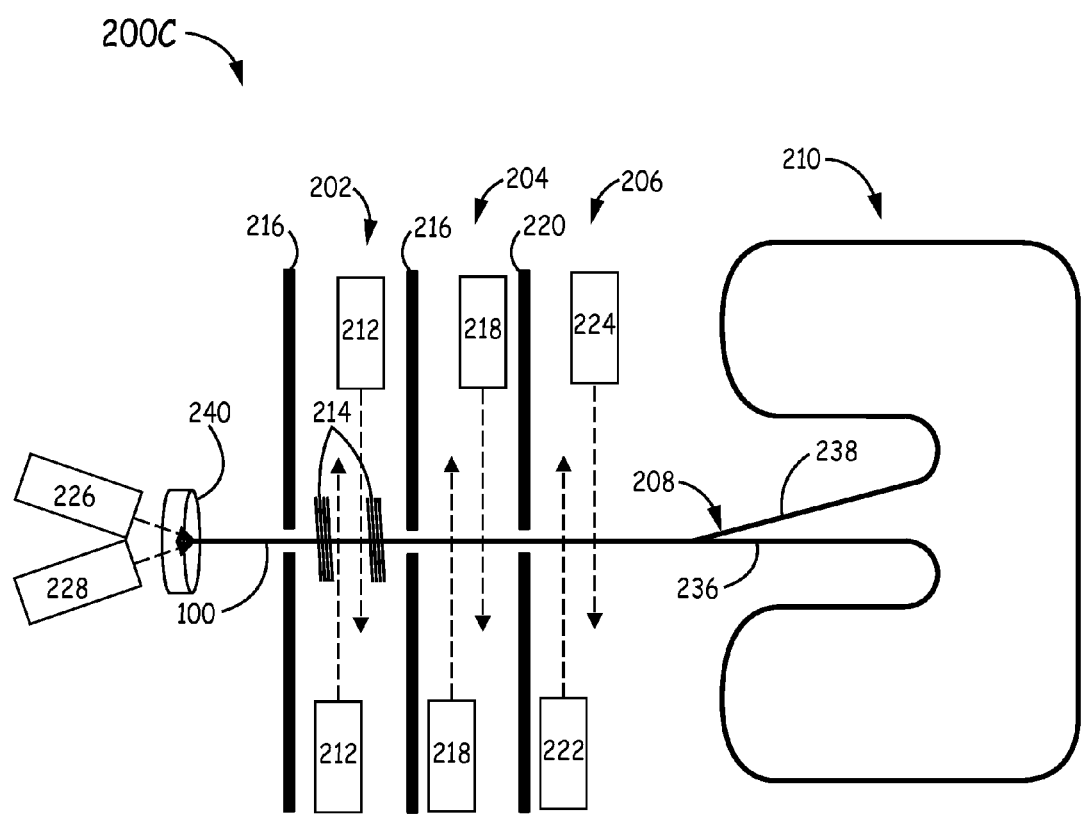

FIGS. 2A-2C are block diagrams depicting exemplary embodiments of waveguide gyroscopes having one or more loops within a waveguide. FIG. 2A is a block diagram depicting an exemplary embodiment of a waveguide gyroscope having two loops within the waveguide. FIG. 2B is a block diagram depicting an exemplary embodiment of a waveguide gyroscope having a single loop within the waveguide. FIG. 2C is a block diagram depicting another exemplary embodiment of a waveguide gyroscope having a single loop within the waveguide.

Figure 3:
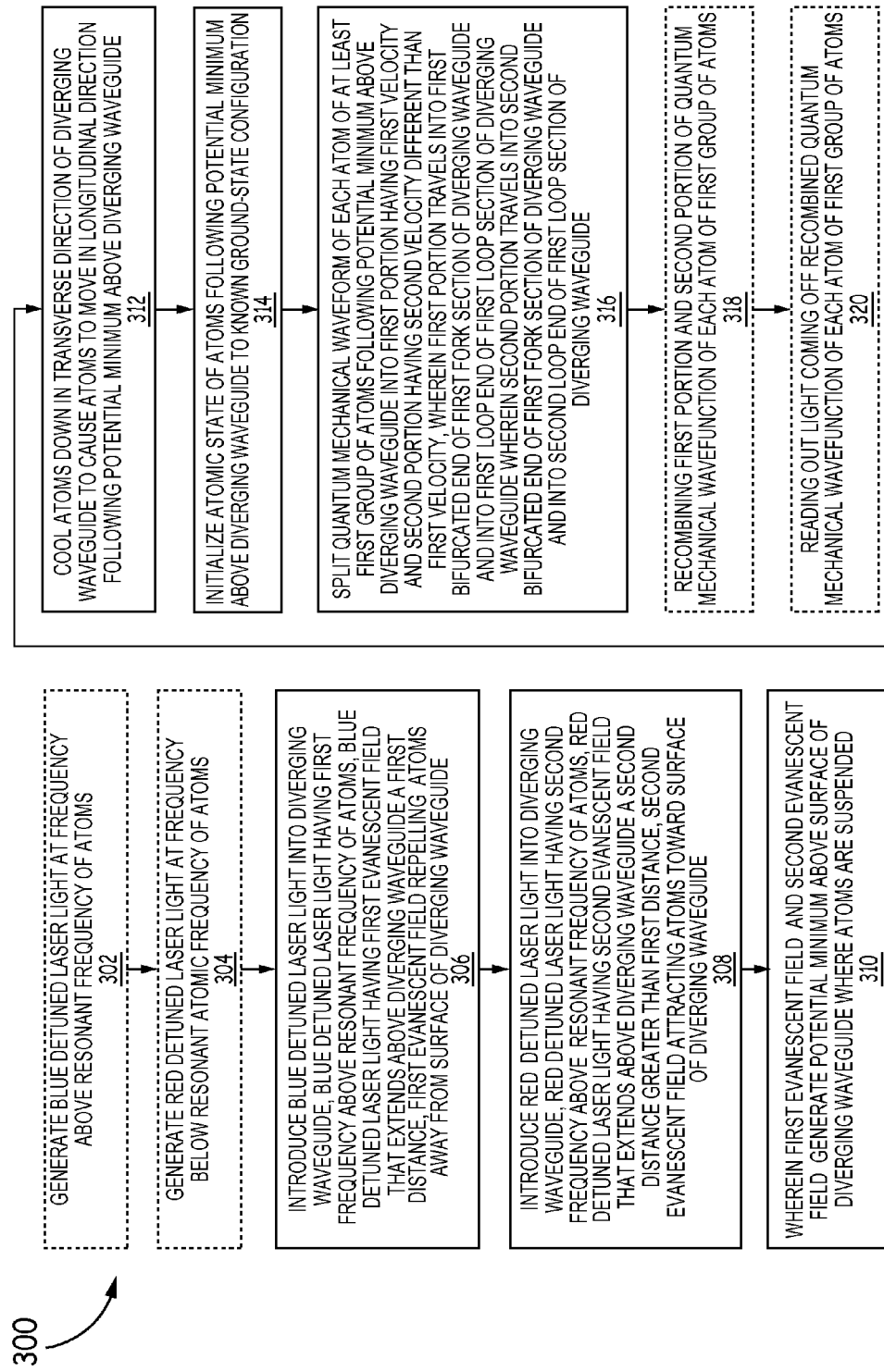

FIG. 3 is a flow diagram illustrating an exemplary method of operating a diverging waveguide atomic gyroscope.

In accordance with common practice, the various described features are not drawn to scale but are drawn to emphasize specific features relevant to the exemplary embodiments.

SUMMARY

A diverging waveguide includes: a first section having a first end and a second end opposite the first end; a first fork section having a first single end, the first fork section also having a first bifurcated end and a second bifurcated end opposite the first single end, the first single end of the first fork section coupled to the first end of the first section, the first fork section configured with a first angle between the first bifurcated end and the second bifurcated end, the first angle determined based on velocities of portions of a quantum mechanical wavefunction of atoms configured to travel above the waveguide; and a first loop section having a first loop end and a second loop end, the first loop end coupled to the first bifurcated end of the first fork section and the second loop end coupled to the second bifurcated end of the first fork section.

The diverging waveguide is configured to propagate a blue-detuned waveguide laser light, the blue-detuned waveguide laser light at a first frequency above a resonant atomic frequency of atoms above a surface of the diverging waveguide, the blue-detuned laser light having a first evanescent field that extends above the surface of the diverging waveguide a first distance, the first evanescent field repelling the atoms away from the surface of the diverging waveguide. The diverging waveguide is configured to propagate a red-detuned waveguide laser light, the red-detuned waveguide laser light at a second frequency below the resonant atomic frequency of the atoms above the surface of the diverging waveguide, the red-detuned laser light having a second evanescent field that extends above the surface of the diverging waveguide a second distance that is greater than the first distance, the second evanescent field attracting the atoms toward the surface of the diverging waveguide. The first evanescent field and the second evanescent field create a potential minimum/well above the surface of the diverging waveguide, wherein the atoms are suspended in the potential minimum/well.

The first section of the diverging waveguide includes: a laser cooling section positioned between the first end of the first section and the second end of the first section, the laser cooling section configured to cool at least a first group of the atoms down in a transverse direction to the first section of the diverging waveguide, causing the at least the first group of the atoms positioned in the potential minimum/well above the surface of the diverging waveguide to move in a first longitudinal direction toward the first fork section following the potential minimum/well above the surface of the diverging waveguide; a first atomic state initialization section positioned between the laser cooling section and the first fork section, the first atomic state initialization section configured to initialize atomic states of the at least the first group of the atoms moving in the first longitudinal direction following the potential minimum/well above the surface of the diverging waveguide to a known ground-state configuration; and a first beam splitter section positioned between the first atomic state initialization section and the first fork section, the first beam splitter section configured to split a quantum mechanical wavefunction of each atom of the at least the first group of the atoms moving in the first longitudinal direction following the potential minimum/well above the surface of the diverging waveguide into a first portion having a first velocity and a second portion having a second velocity different than the first velocity, wherein the first portion travels into the first bifurcated end of the first fork section of the diverging waveguide and into the first loop end of the first loop section, and wherein the second portion travels into the second bifurcated end of the first fork section of the diverging waveguide and into the second loop end of the first loop section.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The navigation market is driving towards smaller gyroscopes without sacrificing scale factor or stability. Atomic interferometers provide high flux of the signal-generating object (for high signal to noise ratio (SNR)) and good stability by referencing the scale factor to the wavelength of light. However, their scale factor typically suffers when miniaturized. Described herein are devices and methodologies for preserving scale factor while miniaturizing an atomic interferometer. In exemplary embodiments, a diverging optical waveguide is converted into a trap and/or guide for atoms positioned above the surface of the waveguide. This allows the atoms to traverse a circular path, coming back upon themselves for interference. The diverging waveguide allows this to happen in a much smaller area for a given scale factor than could be achieved without the waveguide.

FIG. 1 is a cross sectional diagram showing a waveguide 100 having a potential minimum/well 102 for atoms above a surface 104 of the waveguide 100. In exemplary embodiments, the waveguide 100 is an optical waveguide on a chip 106 for atoms above the chip 106. In exemplary embodiments, the chip 106 is a substrate, such as but not limited to, a silicon substrate. In exemplary embodiments, the waveguide 100 is a silicon nitride ridged waveguide. With the proper choice of two different light fields traveling down the optical waveguide, the evanescent field of the light in the waveguide 100 becomes a trap for atoms traveling above the waveguide 100, guiding the atoms along a path above the waveguide 100, but without touching the physical surface 104 of the waveguide 100. In exemplary embodiments, a red-detuned waveguide laser light is generated using a red-detuned waveguide laser source 226 (shown in FIGS. 2A-2C) detuned below an atomic resonant frequency of the atoms positioned above the waveguide 100 and a blue-detuned waveguide laser light is generated using a blue-detuned waveguide laser source 228 (shown in FIGS. 2A-2C) detuned above the atomic resonant frequency of the atoms positioned above the waveguide 100. The red-detuned waveguide laser light is attractive to the atoms, so that it creates a potential minimum/well that pulls in the atoms toward the waveguide 100. In contrast, the blue-detuned waveguide laser light is repulsive to the atoms, so it pushes the atoms away from the waveguide 100.

In exemplary embodiments, there is both an attractive evanescent field 108 created by the red-detuned waveguide laser light and a repulsive evanescent field 110 created by the blue-detuned waveguide laser light that both extend above the surface 104 of the waveguide 100. In exemplary embodiments, both the attractive evanescent field 108 and the repulsive evanescent field 110 extend above the surface 104 of the waveguide 100 by a few hundreds of nanometers. The intensity of each of the attractive evanescent field 108 and the repulsive evanescent field 110 decreases with distance above the surface 104 of the waveguide 100. This causes the atoms above the surface 104 of the waveguide 100 to experience both the attractive force of the attractive evanescent field 108 created by the red-detuned waveguide laser light and the repulsive force of the repulsive evanescent field 110 created by the blue-detuned waveguide laser light. Were only the attractive evanescent field 108 generated by the red-detuned waveguide laser light present, the atoms would be pulled down onto the surface 104 of the waveguide 100 where the atoms would stick, bounce away, or otherwise be lost. The blue-detuned waveguide laser light (the repulsive laser) has a repulsive evanescent field 110 that does not extend as far above the surface 104 of the waveguide 100 as the attractive evanescent field 108 created by the red-detuned waveguide laser light (the attractive laser). The atoms get pulled toward the surface 104 of the waveguide 100 by the attractive evanescent field 108 created by the red-detuned waveguide laser light. As the atoms get closer to the surface 104 of the waveguide 100, the atoms start to experience the repulsive force of the repulsive evanescent field 110 created by the blue-detuned waveguide laser light that pushes the atoms away from the surface 104 of the waveguide 100. In response to these attractive and repulsive forces, the atoms find a potential minimum/well 102 above the surface 104 of the waveguide 100. In exemplary embodiments, the potential minimum/well 102 is a couple hundred nanometers above the surface 104 of the waveguide 100.

In exemplary embodiments, the red-detuned waveguide laser light and the blue-detuned waveguide laser light are coupled into the waveguide 100 in various ways, as shown in FIGS. 2A-2C. In exemplary embodiments, such as that shown in FIG. 2A-2C, the red-detuned waveguide laser light and the blue-detuned waveguide laser light are transmitted from red-detuned waveguide laser source 226 and blue-detuned waveguide laser source 228 respectively into optical fibers where light from the red-detuned waveguide laser light and the blue-detuned waveguide laser light is coupled into ancillary waveguides (such as ancillary waveguide 232 coupled to red-detuned waveguide laser source 226 and/or ancillary waveguide 234 coupled to blue-detuned waveguide laser source 228) through a coupling and/or fitting. Ancillary waveguide 232 carries the red-detuned waveguide laser light and ancillary waveguide 234 carries the blue-detuned waveguide laser light. Both pass near the waveguide 100 used for interferometry where at least some of the red-detuned laser light is coupled from the ancillary waveguide 232 through an evanescent field into waveguide 100 being used for interferometry and some of the blue-detuned laser light is coupled from the ancillary waveguide 234 through an evanescent field into the waveguide 100 being used for interferometry.

In exemplary embodiments, the red-detuned waveguide laser light and the blue-detuned waveguide laser light differ by many nanometers and are both relatively far detuned from the atomic resonance. In the case of Rubidium, atomic resonance is 780 nanometers. In this case, the blue-detuned laser light might be approximately 632 nanometers, which is a convenient diode wavelength. In contrast, the red-detuned laser light might be approximately 852 nanometers, which is another available diode wavelength. In exemplary embodiments, the AC Stark Effect shifts the energy of the atoms downward for red-detuned light (light that has a lower frequency than resonance) and it shifts the atomic energy upward for blue-detuned light (light that has a higher frequency than resonance). With both the 852 and 632 nanometer (or other appropriate) sources coupled into the waveguide 100, blue-detuned light raises the atomic energy and pushing the atoms away from the surface 104 of the waveguide 100 while red-detuned light pulls the atoms in toward the surface 104 of the waveguide 100. The light sources can be set up to act in such a way so as to create a waveguide potential minimum/well that suspends the atoms above the surface 104 of the waveguide 100 far enough away from the surface 104 of the waveguide 100 so that the atoms do not touch, bump against, or scatter against the surface 104 of the waveguide 100. Instead, the atoms move longitudinally above the surface 104 of the waveguide 100, supported by the optical potential.

FIGS. 2A-2C are block diagrams depicting exemplary embodiments of waveguide gyroscopes 200 having one or more loop sections 210 within the waveguide 100. FIG. 2A is a block diagram depicting an exemplary embodiment of a waveguide gyroscope 200A having two loop sections 210 within the waveguide 100. FIG. 2B is a block diagram depicting an exemplary embodiment of a waveguide gyroscope 200B having a single loop section 210 within the waveguide 100. FIG. 2C is a block diagram depicting another exemplary embodiment of a waveguide gyroscope 200C having a single loop section 210 within the waveguide 100.

In exemplary embodiments, the waveguide gyroscopes 200A-200C are atom interferometers. Atom interferometers may be used to do inertial sensing. Within the class of atom interferometers that are used for inertial sensing, there are at least two different approaches: (1) a free-space approach where atoms are launched or held in free space and probed with lasers; and (2) a waveguide approach where atoms are shuttled along a waveguide, such as the waveguide 100. The waveguide 100 can be magnetic or optical. In exemplary embodiments, atoms are loaded onto an optical waveguide 100 where interferometry is performed on the atoms for rotation sensing.

In exemplary embodiments, the waveguide 100 includes a singly-connected section and one or more loop sections 210 (doubly-connected sections) such that atoms guided above the surface 104 of the waveguide 100 can be split at section 208 and travel both directions around the loop section(s) 210. Atoms returning to where they were split at section 208 are recombined and interfere with themselves, showing a phase shift proportional to the rotation times the area of the loop section 210. Atoms are split by light shining at section 208 of the waveguide 100 where it changes from singly-connected to doubly-connected. The light of section 208 is configured to put the atoms into a superposition of states causing a quantum mechanical waveform for each atom to be split into two portions: (1) a first portion of which enters the loop section 210 going one direction; and (2) a second portion of which enters the loop section 210 going the other direction. This is possible because the light imparts momentum to one of the atomic states in the superposition.

Atoms are first cooled in two dimensions and allowed to enter above the singly-connected section of the waveguide 100 in the third dimension. The waveguide 100 guides the atoms toward the loop section 210. The atoms are split by a splitting beam from a first beam splitter laser source 222 before reaching the loop section 210. The atoms will pass through the light beam generated by first beam splitter laser source 222, which is just wide enough that the atoms will be in the splitting beam for the right amount of time to be transferred to a 50/50 superposition of states. (In exemplary embodiments, the traversal time will turn the light into the equivalent of a pi/2 pulse.)

The waveguide 100 may undergo one or more turns in the loop section 210 in order to reject the hottest atoms, which will be loosely trapped in the potential minimum/well and fall out at the corners. The atoms will be guided both directions around the loop section 210 of the waveguide 100, returning to the splitting beam (from the first beam splitter laser source 222) again. At this point, the atoms again pass through the splitting beam (from the first beam splitter laser source 222), again experiencing a pi/2 pulse. A group of the atoms are recombined on the same trajectory where they interfere with themselves to give a fringe depending on the rotation of the loop during the transit time. In exemplary embodiments, additional loop sections 210 are used for disambiguation of the phase of the interference fringe. In exemplary embodiments, each loop section 210 has a different area than the other loop sections 210. Smaller loop sections 210 would have a smaller scale factor, which could be used to help keep track of the phase in larger loop sections 210. Larger loop sections 210 are desirable for their large scale factor.

In exemplary embodiments, the waveguide gyroscope 200A includes a number of different sections on a straight section of the waveguide 100. In exemplary embodiments, these sections include section 202, section 204, section 206, and section 208. In exemplary embodiments, these sections are spaced out by a few millimeters each.

The first section 202 is where the atoms are cooled using laser cooling techniques. In exemplary embodiments, a laser cooling configuration known as a 2D magneto-optical trap (MOT) is used. In exemplary embodiments, the 2D MOT decreases the transverse velocity of the atoms so that they will be pulled into the potential minimum/well 102 that is created by the waveguide 100. In exemplary embodiments, the 2D MOT allows the atoms to retain some longitudinal velocity that launches them into a guided section above the surface 104 of the waveguide 100. In exemplary embodiments, section 202 includes two cooling laser fields from cooling laser sources 212, one from each side of the waveguide 100. The cooling laser sources 212 emit the cooling laser fields that reduce the atoms velocity along the transverse direction. As the atoms are cooled they begin to travel away from the center in the guided area above the surface 104 of the waveguide 100 and then pass through additional laser fields in sections 204 and section 206. In exemplary embodiments, section 202 is essentially focusing the atoms in the transverse direction so that they are more concentrated and causing the atoms to move in the longitudinal direction. The atom density increases in the transverse direction.

In exemplary embodiments, the 2D MOT includes a combination of cooling laser fields from cooling laser sources 212 and magnetic fields generated by magnetic field coils 214 (shown in FIGS. 2A-2C by the slightly tilted parallel lines). The magnetic field coils 214 are oriented such that they shift the atomic energy levels in such a way that atoms that are moving against cooling laser fields from the cooling laser sources 212 will preferentially absorb photons of light from the cooling laser fields so that they will be pushed back toward the center of the coil set of the magnetic field coils 214. In exemplary embodiments, the cooling action becomes a trapping action because whenever the atoms try to move against the cooling laser fields of the cooling laser sources 212, they are also directed towards a specific location in space. This results in a population of cooled atoms that is located near the waveguide. In exemplary embodiments, the atoms are cooled to temperatures of tens of micro-Kelvin along that transverse direction. The atoms retain velocity along the longitudinal direction and they begin to move outward along the waveguide 100 away from that laser cooling section (section 202). In other embodiments, the cooling result is achieved in other ways in section 202, such as by passing the atoms through a series of pinholes such that the hot atoms are skimmed off. In these embodiments, the atoms that come out of the pinholes are just as cold as they were in other embodiments, though fewer of them come out. Rather than cooling the atoms, the hot ones are just skimmed off.

Waveguide gyroscope 200A includes loop sections 210 on both the right and the left sides. In other embodiments there is only one loop section 210, such as with waveguide gyroscopes 200B-200C. As atoms being to move longitudinally above the surface 104 along waveguide 100 toward the right side of waveguide gyroscope 200A, the atoms pass first through an optical baffle 216 that separates the laser light/fields that are in the cooling section (section 202) from the light in the next section 204.

The next section 204 is the "initialize atomic state" section. There is a pair of initialization laser fields generated by initialization laser sources 218 that are resonant with the atoms in certain energy levels/states. These are states of the outer electrons around the atom. These atoms have a ground-state and an excited state. In exemplary embodiments, the ground-state is split by the hyperfine interaction into a double ground-state. In the case of Rubidium atoms, these double ground-states are labeled F=1 and F=2, which denotes the angular momentum of those states. In the case of Cesium atoms, these double ground-states are labeled F=3 and F=4. In exemplary embodiments, the atomic state is initialized by shining light from the initialization laser fields from the initialization laser sources 218 on the atoms that are resonant with the F=2 state that drives transitions of the electrons between the F=2 ground-state and the excited state. In exemplary embodiments, atoms begin to fall stochastically into the F=1 state, the lowest of the two ground-states. In exemplary embodiments, this initializes the atoms so that all of the atoms end up in the F=1 ground-state. In exemplary embodiments, this can be done with a single initialization laser field from a single initialization laser source 218 from just one side of the waveguide 100, but this could result in imparting unbalanced momentum to the atoms. In exemplary embodiments, it is usually two initialization laser fields from two initialization laser sources 218 with the same intensity which would balance the optical forces so that no net forces would act on the atoms.

Next the atoms go through another optical baffle 220 to the next section 206. In the section 206, there would be two counter-propagating beam splitter laser fields from two laser sources, first beam splitter laser source 222 and second beam splitter laser source 224. The splitting beam emitted from the first beam splitter laser source 222 would be close to resonant with the F=2 state and the second splitting beam emitted from the second beam splitter laser source 224 would be close to resonant with the F=1 state. They would both be close to resonant with those states, but not resonant with those states. If the resonant frequency of light is $f_0$, then the light would be tuned to $f_0$-$\Delta$ GHz (for example, a couple GHz). It doesn't matter if they are detuned above or below resonant frequency, but both will have the same detuning (the same amount below or above). This results in the frequency difference between F=1 and F=2 being equal to the hyperfine splitting of the ground-state.

While the cooling laser sources 212, initialization laser sources 218, first beam splitter laser source 222, and second beam splitter laser source 224 are shown to be different sources, it is possible that some of them share a common source. In exemplary embodiments, there is a different laser source for each frequency. In exemplary embodiments, dedicated laser sources are used for the cooling laser sources 212. In exemplary implementations, the cooling laser sources 212 are diode lasers. In exemplary embodiments, dedicated laser sources are used for the initialization laser sources 218. In other embodiments, the initialization laser sources 218 are common to the cooling laser sources 212. In exemplary embodiments, the first beam splitter laser source 222 and the second beam splitter laser source 224 are dedicated laser sources. In exemplary embodiments, at least three laser sources are used. In exemplary embodiments, an additional master laser source is locked to an atomic reference and the other laser sources are slaved to the master laser source, as a way of controlling the frequency across the laser sources.

As the atoms pass through section 206, the beam of atoms is split by the beams from the first beam splitter laser source 222 and the second beam splitter laser source 224 so that the atoms are in a quantum superposition of the F=1 and F=2 states. In exemplary embodiments, the beam splitter pulse(s) from the first beam splitter laser source 222 and/or the second beam splitter laser source 224 for the outgoing atoms serves to separate each atom into two halves so that those two halves can proceed in a counter-propagating fashion through the loop section 210. Each atom, rather than being in a well defined state (either F=1 or F=2 for Rb), is instead in a superposition of those two states.

The part of the superposition that is labeled by internal state F=2 also has an additional two photons worth of momentum that is transferred to it by the beam splitter pulse(s) from the first beam splitter laser source 222 and/or the second beam splitter laser source 224. In absorbing those two photons, one from the F=1 pulse and the other from the F=2 beam, it absorbs two photons and it gets two kicks (photons carry momentum) and those two kicks that are picked up by only half of the quantum wave function cause the two halves of the quantum wave function for each atom to begin to diverge in space and enter into section 208 where the waveguide is bifurcated. After this point, the quantum mechanical wavefunction for each atom is split into a first portion having a first velocity and a second portion having a second velocity different than the first velocity. The first portion goes one direction in the loop section 210 of the waveguide 100 and the second portion goes the opposite direction in the loop section 210 of the waveguide 100. After the first portion and the second portion pass through the loop section 210, they will come back through the same sections 208, 206, 204, and 202, but the beams from the various sources 206, 204, and 202 will have different functions for the atoms incoming from the loop section 210 than for the atoms outgoing into the loop section 210.

The pulses from first beam splitter laser source 224 and second beam splitter laser source 226 operate using precise timing. Based on an understanding of the average velocity of the atomic beam traveling longitudinally above the waveguide 100, (1) the width of the pulses from the first beam splitter laser source 224 and/or the second beam splitter laser source 226 are narrowed; and/or (2) the intensity of the pulses from the first beam splitter laser source and/or the second beam splitter laser source 226 are tuned so that the atoms spend the correct amount of time in the laser fields generated by the first beam splitter laser source 224 and/or the second beam splitter laser source 226. In exemplary embodiments, the laser fields generated by the first beam splitter laser source 224 and/or the second beam splitter laser source 226 will cause the atoms to Rabi flop, meaning they transition back and forth between the F=1 and F=2 states as long as the particular laser field is incident onto the atoms.

In exemplary embodiments, it is desirable that the laser field only be incident on the atoms for a very short time, not even long enough to cause the atoms to transition fully between F=1 and F=2. In exemplary embodiments, the laser field is only incident on the atoms for half of the time that it takes for all of the atoms to transition from F=1 to F=2. By having the light on for only half of that amount of time, the atoms end up in between the F=1 and F=2 states, which in quantum language is described as a superposition of the F=1 and F=2 states. This half time is described as a π/2 pulse and comes from the language of Rabi flopping, which has a sine squared dependence. In contrast, a π pulse would drive the atom through a full π phase of that Rabi flopping dependence. A π/2 pulse indicates that only half of that shift from F=1 to F=2 is executed.

In exemplary embodiments, this "pulse" is a pulse only for each atom because each atom is passing through it for a finite period of time. In exemplary embodiments, the laser source is on constantly because there are always new atoms coming through. The width and intensity of the laser field(s)

generated by the first beam splitter laser source 222 and/or the second beam splitter laser source 224 are adjusted such that given the atoms' velocity through the beam(s) it becomes a π/2 pulse for that atom and every other atom that follows it. In exemplary embodiments, the initialization laser sources 218 are also on all the time, but they are not time sensitive. In exemplary embodiments, as long as the initialization laser sources 218 are intense enough to perform their function, they could be even brighter while still performing their function. In exemplary embodiments, intensity multiplied by duration gives a pulse "area" which is matched to the π/2 frequency of the atom.

At section 208, the waveguide 100 forks in such a way that the two forks (bifurcated portion 236 and bifurcated portion 238 of section 208) move apart with a slope that matches the velocity difference of the first portion and the second portion of the quantum mechanical wavefunction of each of the atoms. While it is desirable to keep the atoms in the waveguide 100, it is also desirable to have the atoms move apart. Therefore, the waveguide potential has to be structured in such a way that the atoms naturally go down bifurcated portion 236 or bifurcated portion 238 of section 208. In exemplary embodiments, the waveguide 100 guides light inside it and some of the light leaks out and guides the atoms above the waveguide 100 through evanescent fields. Based on the angles at which a first portion and a second portion of the quantum mechanical waveform for each atoms come out of the beam splitter in section 206, the first bifurcated portion 236 and the second bifurcated portion 238 of section 208 are matched to the velocity of the atoms. Accordingly, a fork section of the diverging waveguide 100 in section 208 is used in combination with the laser beam splitter in section 206 to cause the atoms to choose one side (bifurcated portion 236) or the other (bifurcated portion 238) of that diverging fork of the waveguide 100 in section 208. The diverging fork of the waveguide 100 in section 208 is a physical structure on the waveguide 100 that has an angle. This angle is related to the first velocity of the first portion and the second velocity of the second portion of the quantum mechanical wavefunction of each of the atoms positioned above the waveguide 100 in the potential minimum/well 102.

In exemplary embodiments, the first portion of the quantum mechanical wavefunction of each of the atoms is going straight and passes into the bifurcated portion 236, while the second portion of the quantum mechanical wavefunction of each of the atoms is diverging with a gradual slope, such as 5 microns over 10 millimeters, and passes into the bifurcated portion 238. The slope is selected based on the first velocity of the first portion and the second velocity of the second portion of the quantum mechanical wavefunction of each of the atoms. In exemplary embodiments, the speed of the atoms above the waveguide 100 is the X component of velocity, while the Y component of velocity is two units of the light momentum. This results in a triangle from which the angle is calculated. In exemplary embodiments, the angle between the two forks of the bifurcated section 208 of the waveguide is estimated based on the average longitudinal velocity of the atoms and the known transverse velocity imparted by the splitting laser field(s) from the first beam splitter laser source 222 and/or the second beam splitter laser source 224. In exemplary embodiments, h/(λ·mass) where the transverse velocity is h (Planck's constant) over λ (lambda, the wavelength of light) multiplied by the mass of the atom.

In exemplary embodiments, the atomic state initialization of the atoms in section 204 puts every atom into a single internal state which facilitates subsequent read-out of the atoms after returning from the loop section 210. When the atoms come back from the interferometer (loop section 210), some of them will be transferred to the other internal state. The fraction which get transferred to the other internal state give us a measure of the phase shift that the atoms pick up as a result of rotation.

In exemplary embodiments, having two loop sections 210, there is a single section 202, but sections 204, 206, 208, and 210 are repeated on the left side. The result of the 2D laser cooling in section 202 will be two atomic beams going longitudinally in both directions along the waveguide 100. So the 2D MOT feeds both interferometers (loop sections 210).

In exemplary embodiments, the beam splitting performed in section 206 to send a first portion of the quantum mechanical wavefunction of each of the atoms down a first bifurcated portion 236 of the bifurcated waveguide and a second portion of the quantum mechanical wavefunction of each of the atoms down the second bifurcated portion 238 of the bifurcated waveguide, helps with the scale-factor problem (where scale factor generally suffers when gyroscopes get miniaturized) by enabling a higher scale factor with a smaller device. The angle which the atoms separate due to beam-splitter light (222) is quite small. If that were the only momentum difference between the first portion and second portion of the quantum mechanical wavefunction of each of the atoms, then the first portion and second portion of the quantum mechanical wavefunction of each of the atoms would never get very far apart. Accordingly, the scale factor would be small. By including the bifurcated section 208 of the waveguide 100, that small angle can be expanded out into a much larger area once the first portion and second portion of quantum mechanical wavefunction of each of the atoms are far enough apart from each other follow the first bifurcated portion 236 and the second bifurcated portion 238 of the fork section (section 208) of the waveguide 100. First the quantum mechanical waveform function of each of the atoms diverge into the first portion of the quantum mechanical waveform function and the second portion of the quantum mechanical waveform function for each of the atoms at that small angle based on the beam splitting performed in section 206. Once the first portion and the second portion of the quantum mechanical waveform function for each of the atoms are far enough apart that the first portion and the second portion of the quantum mechanical waveform function of each of the atoms have individual trajectories, the bifurcated section 208 of the waveguide 100 pulls the first portion and second portion of the quantum mechanical waveform function for each of the of atoms apart even farther and into the large enclosed area of the loop section 210. The bifurcated section 208 of the waveguide 100 also brings the first portion and the second portion of quantum mechanical waveform function for each of the atoms back together. This would not be possible without the unique combination of the bifurcated section 208 combined with the beam splitting of the atoms performed in section 206. Without this unique combination, the first portion and the second portion of the quantum mechanical waveform function of each of the atoms would always stay close together with the very small angle created by the beam splitting of the atoms performed in section 206. Because scale factor is proportional to the area enclosed by that waveguide, the larger area of the loop section 210 enabled by the unique combination allows for a much larger scale factor.

There are advantages to exemplary embodiments with two loop sections 210. In exemplary embodiments, the loop sections 210 on each side have slightly different enclosed areas. Exemplary embodiments with two loop sections 210 essentially have two gyroscopes operating independently but measuring the same rotation. First, this enables some redundancy in case one of the loop sections 210 fails. Second, having slightly different scale factors due to slightly different enclosed areas in the two loop sections 210 enables visibility into, and the ability to correct, errors due to thermal expansion of the device. Thermal expansion would slightly modify the enclosed area, but having two different enclosed areas to compare allows calculation of a correction based on the different properties of the two sections. Third, having slightly different enclosed areas and slightly different scale factors aids in overcoming the problem of fringe ambiguity. Fringe ambiguity is a property of interferometers that are based on phase shifts. For high rotation rates, atoms in the interferometer can undergo multiples of $2\pi$ phase shift before they come back out of the interferometer. When the phase shift is measured only after the atoms complete the entire trajectory, the phase shift is only ascertainable modulo $2\pi$. For example, if the phase shift is 1.3 radians, it is not clear whether it is 1.3 radians, $1.3+2\pi$ radians, $1.3+4\pi$ radians, $1.3+N2\pi$ radians, etc. Having two interferometers with slightly different scale factors aids in determining N.

Each loop section 210 on the right and left side of FIG. 2A is a complete loop. The halves of the atoms get separated into two parts at section 206/208, which propagate in opposite directions around that loop and then come back together and get recombined as they come back out the ramped area. On the return trip when they go through section 206, the same laser fields from laser source 222 and laser source 224 that were beam splitter lasers are now recombination pulses on the return trip. The recombination pulse recombines the two halves of the wave function returning from loop section 210 and maps their phase onto internal atomic states which are then read out in section 204 by the initialization lasers generated by initialization laser sources 218 in combination with a photodetector (positioned above the atoms positioned above the surface of the waveguide 100 in exemplary embodiments).

After traversing the loop section 210 in counter-propagating directions, each half of the quantum mechanical wavefunction of each atom is overlapped spatially within the waveguide, and directed back toward the laser cooling in section 202. Each atomic half of the quantum mechanical wavefunction is recombined as it returns through the at least one recombination pulse (the same laser fields from laser source 222 and laser source 224 in section 206. Recombination occurs with a phase shift that depends on rotation. That phase shift is then read out by the laser fields generated by laser sources 218 to provide an output that is proportional to rotation. The initialization laser fields generated by initialization laser sources 218 on the outgoing trip of the atoms to the loop section 210, become readout lasers generated by the same laser sources 218 on the incoming trip from the loop section 210. The signal read by the photodetector gives a measure of the phase shift experienced by the atoms as they pass through that interferometer loop section(s) 210. In exemplary embodiments, the photodetector measures fluorescence emitted by the atoms without affecting the atoms. In exemplary embodiments, this photodetector sits above the atoms positioned above the surface 104 of the waveguide 100 and collects light scattered by the atoms positioned above the surface 104 of the waveguide 100. In exemplary embodiments, the atoms sitting above the surface 104 of the waveguide 100 absorb readout light from the initialization lasers generated by initialization laser sources 218 and scatter the readout light in different directions, where the photodetector/photodiode receives the scattered readout light. In exemplary embodiments, the photodetector/photodiode doesn't detect laser light directly from the readout laser fields generated by initialization/readout laser sources 218 and is positioned to only detect the light coming off the atoms.

In exemplary embodiments with only a single loop section 210, such as those shown in FIGS. 2B-2C, there may be an advantage to having a small loop and/or mirror on the terminating end of the waveguide to return the red-detuned waveguide laser light from the red-detuned waveguide laser source 226 and the blue-detuned waveguide laser light from the blue-detuned waveguide laser source 228 so that the red-detuned waveguide laser light and the blue-detuned waveguide laser light is retained in the waveguide 100 rather than lost. In exemplary embodiments, such as shown in FIG. 2B, it is terminated in a mirror 240 that bounces the light back. In exemplary embodiments, such as shown in FIG. 2C, the red-detuned waveguide laser source 226 and the blue-detuned waveguide laser source 228 are introduced through a partially transmissive mirror 240.

FIG. 3 is a flow diagram illustrating an exemplary method 300 of operating a diverging waveguide atomic gyroscope. Method 300 begins at optional block 302 with generating a blue-detuned laser light at a first frequency above a resonant frequency of atoms positioned above a diverging waveguide. Method 300 proceeds to optional block 304 with generating a red-detuned laser light at a second frequency below the resonant frequency of the atoms positioned above the diverging waveguide.

Method 300 proceeds to block 306 with introducing the blue-detuned laser light into the diverging waveguide, the blue-detuned laser light having the first frequency above the resonant atomic frequency of the atoms above the surface of the diverging waveguide. The blue-detuned laser light having a first evanescent field that extends above the diverging waveguide a first distance, the first evanescent field repelling the atoms away from the surface of the diverging waveguide. Method 300 proceeds to block 308 with introducing the red-detuned laser light into the diverging waveguide. The red-detuned laser light having the second frequency below the resonant atomic frequency of the atoms above the surface of the diverging waveguide. The red-detuned laser light having a second evanescent field that extends above the diverging waveguide a second distance that is greater than the first distance, the second evanescent field attracting the atoms toward the surface of the diverging waveguide.

Method 300 proceeds to block 310 with wherein the first evanescent field and the second evanescent field create a potential minimum/well above the surface of the diverging waveguide where the atoms are suspended. Method 300 proceeds to block 312 with cooling at least a first group of the atoms in a transverse direction to the diverging waveguide to cause the at least the first group of the atoms to move in a first longitudinal direction following the potential minimum/well above the diverging waveguide. Method 300 proceeds to block 314 with initializing the atomic states of the at least the first group of the atoms following the potential minimum/well above the diverging waveguide to a known ground-state configuration. In exemplary implementations, the known ground-state configuration is a lower ground-state of a double ground-state. In other implementations, the known ground-state is a higher ground-state of a double ground-state.

Method 300 proceeds to block 316 with splitting a quantum mechanical wavefunction of each atom of the at least the first group of atoms following the potential minimum/well above the diverging waveguide into a first portion having a first velocity and a second portion having a second velocity different than the first velocity, wherein the first portion travels into a first bifurcated end of a first fork section of the diverging waveguide and into a first loop end of a first loop section of the diverging waveguide, wherein the second portion travels into a second bifurcated end of the first fork section of the diverging waveguide and into a second loop end of the first loop section of the diverging waveguide.

Method 300 proceeds to optional block 318 with recombining the first portion and the second portion of the quantum mechanical wavefunction of each atom of the first group of atoms. Method 300 proceeds to optional block 320 with reading out light coming off the recombined quantum mechanical wavefunction of each atom of the first group of the atoms.

In exemplary embodiments, a processing device is configured to control a gyroscope implementing a diverging waveguide, such as waveguide gyroscopes 200A, 200B, or 200C. In exemplary embodiments, the processing device includes or functions with software programs, firmware or other computer readable instructions for carrying out various methods, process tasks, calculations, and control functions, used in the gyroscopes. These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. For example, it is to be understood that a number of different types of lasers could also be used. Therefore, it is manifestly intended that this invention be limited only by the claims and the equivalents thereof.

Example Embodiments

Example 1 includes a diverging waveguide including: a first section having a first end and a second end opposite the first end; a first fork section having a first single end, the first fork section also having a first bifurcated end and a second bifurcated end opposite the first single end, the first single end of the first fork section coupled to the first end of the first section, the first fork section configured with a first angle between the first bifurcated end and the second bifurcated end, the first angle determined based on velocities of portions of a quantum mechanical wavefunction of atoms configured to travel above the waveguide; and a first loop section having a first loop end and a second loop end, the first loop end coupled to the first bifurcated end of the first fork section and the second loop end coupled to the second bifurcated end of the first fork section; wherein the diverging waveguide is configured to propagate a blue-detuned waveguide laser light, the blue-detuned waveguide laser light at a first frequency above a resonant atomic frequency of atoms above a surface of the diverging waveguide, the blue-detuned laser light having a first evanescent field that extends above the surface of the diverging waveguide a first distance, the first evanescent field repelling the atoms away from the surface of the diverging waveguide; wherein the diverging waveguide is configured to propagate a red-detuned waveguide laser light, the red-detuned waveguide laser light at a second frequency below the resonant atomic frequency of the atoms above the surface of the diverging waveguide, the red-detuned laser light having a second evanescent field that extends above the surface of the diverging waveguide a second distance that is greater than the first distance, the second evanescent field attracting the atoms toward the surface of the diverging waveguide; wherein the first evanescent field and the second evanescent field create a potential minimum/well above the surface of the diverging waveguide, wherein the atoms are suspended in the potential minimum/well; wherein the first section of the diverging waveguide includes: a laser cooling section positioned between the first end of the first section and the second end of the first section, the laser cooling section configured to cool at least a first group of the atoms down in a transverse direction to the first section of the diverging waveguide, causing the at least the first group of the atoms positioned in the potential minimum/well above the surface of the diverging waveguide to move in a first longitudinal direction toward the first fork section following the potential minimum/well above the surface of the diverging waveguide; a first atomic state initialization section positioned between the laser cooling section and the first fork section, the first atomic state initialization section configured to initialize atomic states of the at least the first group of the atoms moving in the first longitudinal direction following the potential minimum/well above the surface of the diverging waveguide to a known ground-state configuration; and a first beam splitter section positioned between the first atomic state initialization section and the first fork section, the first beam splitter section configured to split a quantum mechanical wavefunction of each atom of the at least the first group of the atoms moving in the first longitudinal direction following the potential minimum/well above the surface of the diverging waveguide into a first portion having a first velocity and a second portion having a second velocity different than the first velocity, wherein the first portion travels into the first bifurcated end of the first fork section of the diverging waveguide and into the first loop end of the first loop section, and wherein the second portion travels into the second bifurcated end of the first fork section of the diverging waveguide and into the second loop end of the first loop section.

Example 2 includes the diverging waveguide of Example 1, wherein the laser cooling section includes: at least one cooling laser source configured to generate at least one cooling laser field, wherein the velocity of the atoms is reduced when the atoms attempt to move against the at least one cooling laser field of the at least one cooling laser source.

Example 3 includes the diverging waveguide of Example 2, wherein the laser cooling section includes: a magnetic field coil set including a first magnetic field coil and a second magnetic field coil and configured with a space between the first magnetic field coil and the second magnetic field coil, the magnetic field coil set configured to shift atomic energy levels of the atoms in such a way that any of the atoms that are moving against the cooling laser field from the cooling laser source preferentially absorb photons of light from the cooling laser field so that the atoms will be pushed back toward the center of the magnetic field coil set within the space between the first magnetic field coil and the second magnetic field coil.

Example 4 includes the diverging waveguide of any of Examples 1-3, wherein the diverging waveguide includes: a second fork section having a second single end, the second fork section also having a third bifurcated end and a fourth bifurcated end opposite the second single end, the second single end of the of the second fork section coupled to the second end of the first section, the second fork section configured with a second angle between the third bifurcated end and the fourth bifurcated end, the second angle determined based on velocities of the portions of a quantum mechanical wavefunction of atoms configured to travel above the waveguide; and a second loop section having a third loop end and a fourth loop end, the third loop end coupled to the third bifurcated end of the second fork section and the fourth loop end coupled to the fourth bifurcated end of the second fork section.

Example 5 includes the diverging waveguide of Example 4, wherein the first section of the diverging waveguide further includes: wherein the laser cooling section causes at least a second group of the atoms positioned in the potential minimum/well above the surface of the diverging waveguide to move in a second longitudinal direction opposite the first longitudinal direction and towards the second fork section and following the potential minimum/well above the diverging waveguide; a second atomic state initialization section positioned between the laser cooling section and the second fork section, the second atomic state initialization section configured to initialize atomic states of at least the first group of the atoms moving in the second longitudinal direction following the potential minimum/well above the surface of the diverging waveguide to a second known ground-state configuration; and a second beam splitter section positioned between the second atomic state initialization section and the second fork section, the second beam splitter section configured to split the a quantum mechanical wavefunction of each atom of the at least the second group of the atoms moving in the second longitudinal direction following the potential minimum/well above the surface of the diverging waveguide into a third portion having a third velocity and a fourth portion having a fourth velocity that is different from the third velocity, wherein the third portion travels into the third bifurcated end of the second fork section of the diverging waveguide and into the third loop end of the second loop section, and wherein the fourth portion travels into the fourth bifurcated end of the second fork section of the diverging waveguide and into the fourth loop end of the second loop section.

Example 6 includes the diverging waveguide of any of Examples 1-5, further comprising: a mirror positioned at the second end of the first section, the mirror configured to reflect light received at the second end of the first section back toward the first fork section and the first loop section.

Example 7 includes the diverging waveguide of any of Examples 1-6, further comprising: wherein the first beam splitter section is further configured as a recombination section for the at least the first group of the atoms returning from the first loop section back into the first section, the recombination section configured to recombine the first portion and the second portion into the quantum mechanical waveform for each atom of the at least the first group of the atoms; and wherein the first atomic state initialization section is further configured as a read-out section for the at least the first group of atoms returning from the first loop section in a second longitudinal direction opposite the first longitudinal direction toward the laser cooling section, wherein the read-out section is configured to read out light coming off the recombined quantum mechanical waveform of the at least the first group of the atoms.

Example 8 includes the diverging waveguide of Example 7, wherein the read-out section includes: a photodetector configured to detect the light coming off the recombined quantum mechanical waveform of the at least the first group of the atoms.

Example 9 includes the diverging waveguide of any of Examples 1-8, wherein the diverging waveguide is deposited on a substrate.

Example 10 includes a method comprising: introducing a blue-detuned laser light into a diverging waveguide, the blue-detuned laser light having a first frequency above a resonant atomic frequency of atoms above a surface of the diverging waveguide, the blue-detuned laser light having a first evanescent field that extends above the diverging waveguide a first distance, the first evanescent field repelling the atoms away from the surface of the diverging waveguide; introducing a red-detuned laser light into the diverging waveguide, the red-detuned laser light having a second frequency below the resonant atomic frequency of the atoms above the surface of the diverging waveguide, the red-detuned laser light having a second evanescent field that extends above the diverging waveguide a second distance that is greater than the first distance, the second evanescent field attracting the atoms toward the surface of the diverging waveguide; wherein the first evanescent field and the second evanescent field create a potential minimum/well above the surface of the diverging waveguide where the atoms are suspended; cooling at least a first group of the atoms down in a transverse direction to the diverging waveguide to cause the at least the first group of the atoms to move in a first longitudinal direction following the potential minimum/well above the diverging waveguide; initializing atomic states of the at least the first group of the atoms following the potential minimum/well above the diverging waveguide to a known ground-state configuration; splitting a quantum mechanical wavefunction of each atom of the at least the first group of the atoms following the potential minimum/ well above the diverging waveguide into a first portion having a first velocity and a second portion having a second velocity different than the first velocity, wherein the first portion travels into a first bifurcated end of a first fork section of the diverging waveguide and into a first loop end of a first loop section of the diverging waveguide, wherein the second portion travels into a second bifurcated end of the first fork section of the diverging waveguide and into a second loop end of the first loop section of the diverging waveguide.

Example 11 includes the method of Example 10, wherein cooling at least the first group of the atoms down in the transverse direction of the diverging waveguide to cause the at least the first group of the atoms to move in the first longitudinal direction following the potential minimum/well above the diverging waveguide includes emitting at least one cooling laser field at the at least the first group of the atoms causing the velocity of the at least the first group of the atoms to be reduced when the at least the first group of the atoms attempt to move against the at least one cooling laser field.

Example 12 includes the method of Example 11, wherein cooling the at least the first group of the atoms down in the transverse direction of the diverging waveguide to cause the at least the first group of the atoms to move in the first longitudinal direction following the potential minimum/well above the diverging waveguide includes shifting atomic energy levels of the atoms in such a way that any of the atoms that are moving against the cooling laser field from the cooling laser source preferentially absorb photons of light from the cooling laser field so that the atoms will be pushed back toward the center of a magnetic field within a space between a set of magnetic field coils.

Example 13 includes the method of any of Examples 10-12, further comprising: wherein cooling the at least the first group of the atoms down in the transverse direction of the diverging waveguide causes at least a second group of the atoms to move in a second longitudinal direction following the potential minimum/well above the diverging waveguide; initializing atomic states of the at least the second group of the atoms following the potential minimum/well above the diverging waveguide to a second known ground-state configuration; and splitting a quantum mechanical wavefunction of each atom of the second group of the atoms following the potential minimum/well above the diverging waveguide into a third portion having a third velocity and a fourth portion having a fourth velocity different than the first velocity, wherein the third portion travels into a third bifurcated end of the second fork section of the diverging waveguide and into a third loop end of the second loop section of the diverging waveguide, wherein the fourth portion travels into a fourth bifurcated end of the second fork section of the diverging waveguide and into a fourth loop end of the second loop section of the diverging waveguide.

Example 14 includes the method of any of Examples 10-13, further comprising: reflecting light received at a second end of the diverging waveguide opposite the first forked section of the diverging waveguide back toward the first forked section of the diverging waveguide.

Example 15 includes the method of any of Examples 10-14, further comprising: recombining the first portion and the second portion into the quantum mechanical waveform for each atom of the at least the second group of the atoms; and reading out light coming off the recombined quantum mechanical waveform of the at least the first group of the atoms.

Example 16 includes an atomic gyroscope comprising: a diverging waveguide deposited on a substrate, the diverging waveguide including: a first section having a first end and a second end opposite the first end; a first fork section having a first single end, the first fork section also having a first bifurcated end and a second bifurcated end opposite the first single end, the first single end of the first fork section coupled to the first end of the first section, the first fork section configured with a first angle between the first bifurcated end and the second bifurcated end, the first angle determined based on velocities of portions of a quantum mechanical wavefunction of atoms configured to travel above the waveguide; and a first loop section having a first loop end and a second loop end, the first loop end coupled to the first bifurcated end of the first fork section and the second loop end coupled to the second bifurcated end of the first fork section; a blue-detuned waveguide laser source configured to generate a blue-detuned laser light at a first frequency above a resonant atomic frequency of atoms above a surface of the diverging waveguide, wherein the blue-detuned laser light is coupled into the diverging waveguide, the blue-detuned laser light having a first evanescent field that extends above the surface of the diverging waveguide a first distance, the first evanescent field repelling the atoms away from the surface of the diverging waveguide; a red-detuned waveguide laser source configured to generate a red-detuned laser light at a second frequency below the resonant atomic frequency of the atoms above the surface of the diverging waveguide, wherein the red-detuned laser light is coupled into the diverging waveguide, the red-detuned laser light having a second evanescent field that extends above the surface of the diverging waveguide a second distance that is greater than the first distance, the second evanescent field attracting the atoms toward the surface of the diverging waveguide; wherein the first evanescent field and the second evanescent field create a potential minimum/well above the surface of the diverging waveguide, wherein the atoms are suspended in the potential minimum/well; wherein the first section of the diverging waveguide includes: a laser cooling section positioned between the first end of the first section and the second end of the first section, the laser cooling section configured to cool at least a first group of the atoms down in a transverse direction to the first section of the diverging waveguide, causing the at least the first group of the atoms positioned in the potential minimum/well above the surface of the diverging waveguide to move in a first longitudinal direction toward the first fork section following the potential minimum/well above the surface of the diverging waveguide; a first atomic state initialization section positioned between the laser cooling section and the first fork section, the first atomic state initialization section configured to initialize atomic states of the at least the first group of the atoms moving in the first longitudinal direction following the potential minimum/well above the surface of the diverging waveguide to a known ground-state configuration; and a first beam splitter section positioned between the first atomic state initialization section and the first fork section, the first beam splitter section configured to split a quantum mechanical wavefunction of each atom of the at least the first group of the atoms moving in the first longitudinal direction following the potential minimum/well above the surface of the diverging waveguide into a first portion having a first velocity and a second portion having a second velocity different than the first velocity, wherein the first portion travels into the first bifurcated end of the first fork section of the diverging waveguide and into the first loop end of the first loop section, and wherein the second portion travels into the second bifurcated end of the first fork section of the diverging waveguide and into the second loop end of the first loop section.

Example 17 includes the atomic gyroscope of Example 16, wherein the laser cooling section includes: at least one cooling laser source configured to generate at least one cooling laser field, wherein the velocity of the atoms is reduced when the atoms attempt to move against the at least one cooling laser field of the at least one cooling laser source; and a magnetic field coil set including a first magnetic field coil and a second magnetic field coil and configured with a space between the first magnetic field coil and the second magnetic field coil, the magnetic field coil set configured to shift atomic energy levels of the atoms in such a way that any of the atoms that are moving against the at least one cooling laser field from the at least one cooling laser source preferentially absorb photons of light from the at least one cooling laser field so that the atoms will be pushed back toward the center of the magnetic field coil set within the space between the first magnetic field coil and the second magnetic field coil.

Example 18 includes the atomic gyroscope of any of Examples 16-17, wherein the diverging waveguide includes: a second fork section having a second single end, the second fork section also having a third bifurcated end and a fourth bifurcated end opposite the second single end, the second single end of the of the second fork section coupled to the second end of the first section, the second fork section configured with a second angle between the third bifurcated end and the fourth bifurcated end, the second angle determined based on velocities of the portions of a quantum mechanical wavefunction of atoms configured to travel above the waveguide; a second loop section having a third loop end and a fourth loop end, the third loop end coupled to the third bifurcated end of the second fork section and the fourth loop end coupled to the fourth bifurcated end of the second fork section; wherein the laser cooling section causes at least a second group of the atoms positioned in the potential minimum/well above the surface of the diverging waveguide to move in a second longitudinal direction opposite the first longitudinal direction and towards the second fork section and following the potential minimum/well above the diverging waveguide; and wherein the first section of the diverging waveguide further includes: a second atomic state initialization section positioned between the laser cooling section and the second fork section, the second atomic state initialization section configured to initialize atomic states of at least the first group of the atoms moving in the second longitudinal direction following the potential minimum/well above the surface of the diverging waveguide to a second known ground-state configuration; and a second beam splitter section positioned between the second atomic state initialization section and the second fork section, the second beam splitter section configured to split a quantum mechanical wavefunction of each atom of the at least the second group of the atoms moving in the second longitudinal direction following the potential minimum/well above the surface of the diverging waveguide into a third portion having a third velocity and a fourth portion having a fourth velocity different than the third velocity, wherein the third portion travels into the third bifurcated end of the second fork section of the diverging waveguide and into the third loop end of the second loop section, and wherein the fourth portion travels into the fourth bifurcated end of the second fork section of the diverging waveguide and into the fourth loop end of the second loop section.

Example 19 includes the atomic gyroscope of any of Examples 16-18, further comprising: a mirror positioned at the second end of the first section, the mirror configured to reflect light received at the second end of the first section back toward the first fork section and the first loop section.

Example 20 includes the atomic gyroscope of any of Examples 16-19, further comprising: wherein the first beam splitter section is further configured as a recombination section for the at least the first group of the atoms returning from the first loop section back into the first section, the recombination section configured to recombine the first portion and the second portion into the quantum mechanical waveform for each atom of the at least the first group of the atoms; and wherein the first atomic state initialization section is further configured as a read-out section for the at least the first group of atoms returning from the first loop section in a second longitudinal direction opposite the first longitudinal direction toward the laser cooling section, wherein the read-out section is configured to read out light coming off the recombined quantum mechanical waveform of the at least the first group of the atoms, wherein the read-out section includes a photodetector configured to detect the light coming off the recombined the at least the first group of the atoms.

What is claimed is:
1. A diverging waveguide including:
   a first section having a first end and a second end opposite the first end;
   a first fork section having a first single end, the first fork section also having a first bifurcated end and a second bifurcated end opposite the first single end, the first single end of the first fork section coupled to the first end of the first section, the first fork section configured with a first angle between the first bifurcated end and the second bifurcated end, the first angle determined based on velocities of portions of a quantum mechanical wavefunction of atoms configured to travel above the waveguide; and
   a first loop section having a first loop end and a second loop end, the first loop end coupled to the first bifurcated end of the first fork section and the second loop end coupled to the second bifurcated end of the first fork section;
   wherein the diverging waveguide is configured to propagate a blue-detuned waveguide laser light, the blue-detuned waveguide laser light at a first frequency above a resonant atomic frequency of atoms above a surface of the diverging waveguide, the blue-detuned laser light having a first evanescent field that extends above the surface of the diverging waveguide a first distance, the first evanescent field repelling the atoms away from the surface of the diverging waveguide;
   wherein the diverging waveguide is configured to propagate a red-detuned waveguide laser light, the red-detuned waveguide laser light at a second frequency below the resonant atomic frequency of the atoms above the surface of the diverging waveguide, the red-detuned laser light having a second evanescent field that extends above the surface of the diverging waveguide a second distance that is greater than the first distance, the second evanescent field attracting the atoms toward the surface of the diverging waveguide;
   wherein the first evanescent field and the second evanescent field create a potential minimum/well above the surface of the diverging waveguide, wherein the atoms are suspended in the potential minimum/well;
   wherein the first section of the diverging waveguide includes:
      a laser cooling section positioned between the first end of the first section and the second end of the first section, the laser cooling section configured to cool at least a first group of the atoms down in a transverse direction to the first section of the diverging waveguide, causing the at least the first group of the atoms positioned in the potential minimum/well above the surface of the diverging waveguide to move in a first longitudinal direction toward the first fork section following the potential minimum/well above the surface of the diverging waveguide;
      a first atomic state initialization section positioned between the laser cooling section and the first fork section, the first atomic state initialization section configured to initialize atomic states of the at least the first group of the atoms moving in the first longitudinal direction following the potential mini- mum/well above the surface of the diverging waveguide to a known ground-state configuration; and a first beam splitter section positioned between the first atomic state initialization section and the first fork section, the first beam splitter section configured to split a quantum mechanical wavefunction of each atom of the at least the first group of the atoms moving in the first longitudinal direction following the potential minimum/well above the surface of the diverging waveguide into a first portion having a first velocity and a second portion having a second velocity different than the first velocity, wherein the first portion travels into the first bifurcated end of the first fork section of the diverging waveguide and into the first loop end of the first loop section, and wherein the second portion travels into the second bifurcated end of the first fork section of the diverging waveguide and into the second loop end of the first loop section.

2. The diverging waveguide of claim 1, wherein the laser cooling section includes:
at least one cooling laser source configured to generate at least one cooling laser field, wherein the velocity of the atoms is reduced when the atoms attempt to move against the at least one cooling laser field of the at least one cooling laser source.

3. The diverging waveguide of claim 2, wherein the laser cooling section includes:
a magnetic field coil set including a first magnetic field coil and a second magnetic field coil and configured with a space between the first magnetic field coil and the second magnetic field coil, the magnetic field coil set configured to shift atomic energy levels of the atoms in such a way that any of the atoms that are moving against the cooling laser field from the cooling laser source preferentially absorb photons of light from the cooling laser field so that the atoms will be pushed back toward the center of the magnetic field coil set within the space between the first magnetic field coil and the second magnetic field coil.

4. The diverging waveguide of claim 1, wherein the diverging waveguide includes:
a second fork section having a second single end, the second fork section also having a third bifurcated end and a fourth bifurcated end opposite the second single end, the second single end of the of the second fork section coupled to the second end of the first section, the second fork section configured with a second angle between the third bifurcated end and the fourth bifurcated end, the second angle determined based on velocities of the portions of a quantum mechanical wavefunction of atoms configured to travel above the waveguide; and
a second loop section having a third loop end and a fourth loop end, the third loop end coupled to the third bifurcated end of the second fork section and the fourth loop end coupled to the fourth bifurcated end of the second fork section.

5. The diverging waveguide of claim 4, wherein the first section of the diverging waveguide further includes:
wherein the laser cooling section causes at least a second group of the atoms positioned in the potential minimum/well above the surface of the diverging waveguide to move in a second longitudinal direction opposite the first longitudinal direction and towards the second fork section and following the potential minimum/well above the diverging waveguide;

a second atomic state initialization section positioned between the laser cooling section and the second fork section, the second atomic state initialization section configured to initialize atomic states of at least the first group of the atoms moving in the second longitudinal direction following the potential minimum/well above the surface of the diverging waveguide to a second known ground-state configuration; and a second beam splitter section positioned between the second atomic state initialization section and the second fork section, the second beam splitter section configured to split the a quantum mechanical wavefunction of each atom of the at least the second group of the atoms moving in the second longitudinal direction following the potential minimum/well above the surface of the diverging waveguide into a third portion having a third velocity and a fourth portion having a fourth velocity that is different from the third velocity, wherein the third portion travels into the third bifurcated end of the second fork section of the diverging waveguide and into the third loop end of the second loop section, and wherein the fourth portion travels into the fourth bifurcated end of the second fork section of the diverging waveguide and into the fourth loop end of the second loop section.

6. The diverging waveguide of claim 1, further comprising:
a mirror positioned at the second end of the first section, the mirror configured to reflect light received at the second end of the first section back toward the first fork section and the first loop section.

7. The diverging waveguide of claim 1, further comprising:
wherein the first beam splitter section is further configured as a recombination section for the at least the first group of the atoms returning from the first loop section back into the first section, the recombination section configured to recombine the first portion and the second portion into the quantum mechanical waveform for each atom of the at least the first group of the atoms; and
wherein the first atomic state initialization section is further configured as a read-out section for the at least the first group of atoms returning from the first loop section in a second longitudinal direction opposite the first longitudinal direction toward the laser cooling section, wherein the read-out section is configured to read out light coming off the recombined quantum mechanical waveform of the at least the first group of the atoms.

8. The diverging waveguide of claim 7, wherein the read-out section includes:
a photodetector configured to detect the light coming off the recombined quantum mechanical waveform of the at least the first group of the atoms.

9. The diverging waveguide of claim 1, wherein the diverging waveguide is deposited on a substrate.

10. An atomic gyroscope comprising:
a diverging waveguide deposited on a substrate, the diverging waveguide including:
a first section having a first end and a second end opposite the first end;
a first fork section having a first single end, the first fork section also having a first bifurcated end and a second bifurcated end opposite the first single end, the first single end of the first fork section coupled to the first end of the first section, the first fork section configured with a first angle between the first bifurcated end and the second bifurcated end, the first angle determined based on velocities of portions of a quantum mechanical wavefunction of atoms configured to travel above the waveguide; and a first loop section having a first loop end and a second loop end, the first loop end coupled to the first bifurcated end of the first fork section and the second loop end coupled to the second bifurcated end of the first fork section;

a blue-detuned waveguide laser source configured to generate a blue-detuned laser light at a first frequency above a resonant atomic frequency of atoms above a surface of the diverging waveguide, wherein the blue-detuned laser light is coupled into the diverging waveguide, the blue-detuned laser light having a first evanescent field that extends above the surface of the diverging waveguide a first distance, the first evanescent field repelling the atoms away from the surface of the diverging waveguide;

a red-detuned waveguide laser source configured to generate a red-detuned laser light at a second frequency below the resonant atomic frequency of the atoms above the surface of the diverging waveguide, wherein the red-detuned laser light is coupled into the diverging waveguide, the red-detuned laser light having a second evanescent field that extends above the surface of the diverging waveguide a second distance that is greater than the first distance, the second evanescent field attracting the atoms toward the surface of the diverging waveguide;

wherein the first evanescent field and the second evanescent field create a potential minimum/well above the surface of the diverging waveguide, wherein the atoms are suspended in the potential minimum/well;

wherein the first section of the diverging waveguide includes:

a laser cooling section positioned between the first end of the first section and the second end of the first section, the laser cooling section configured to cool at least a first group of the atoms down in a transverse direction to the first section of the diverging waveguide, causing the at least the first group of the atoms positioned in the potential minimum/well above the surface of the diverging waveguide to move in a first longitudinal direction toward the first fork section following the potential minimum/well above the surface of the diverging waveguide;

a first atomic state initialization section positioned between the laser cooling section and the first fork section, the first atomic state initialization section configured to initialize atomic states of the at least the first group of the atoms moving in the first longitudinal direction following the potential minimum/well above the surface of the diverging waveguide to a known ground-state configuration; and a first beam splitter section positioned between the first atomic state initialization section and the first fork section, the first beam splitter section configured to split a quantum mechanical wavefunction of each atom of the at least the first group of the atoms moving in the first longitudinal direction following the potential minimum/well above the surface of the diverging waveguide into a first portion having a first velocity and a second portion having a second velocity different than the first velocity, wherein the first portion travels into the first bifurcated end of the first fork section of the diverging waveguide and into the first loop end of the first loop section, and wherein the second portion travels into the second bifurcated end of the first fork section of the diverging waveguide and into the second loop end of the first loop section.

11. The atomic gyroscope of claim 10, wherein the laser cooling section includes:

at least one cooling laser source configured to generate at least one cooling laser field, wherein the velocity of the atoms is reduced when the atoms attempt to move against the at least one cooling laser field of the at least one cooling laser source; and a magnetic field coil set including a first magnetic field coil and a second magnetic field coil and configured with a space between the first magnetic field coil and the second magnetic field coil, the magnetic field coil set configured to shift atomic energy levels of the atoms in such a way that any of the atoms that are moving against the at least one cooling laser field from the at least one cooling laser source preferentially absorb photons of light from the at least one cooling laser field so that the atoms will be pushed back toward the center of the magnetic field coil set within the space between the first magnetic field coil and the second magnetic field coil.

12. The atomic gyroscope of claim 10, wherein the diverging waveguide includes:

a second fork section having a second single end, the second fork section also having a third bifurcated end and a fourth bifurcated end opposite the second single end, the second single end of the of the second fork section coupled to the second end of the first section, the second fork section configured with a second angle between the third bifurcated end and the fourth bifurcated end, the second angle determined based on velocities of the portions of a quantum mechanical wavefunction of atoms configured to travel above the waveguide;

a second loop section having a third loop end and a fourth loop end, the third loop end coupled to the third bifurcated end of the second fork section and the fourth loop end coupled to the fourth bifurcated end of the second fork section;

wherein the laser cooling section causes at least a second group of the atoms positioned in the potential minimum/well above the surface of the diverging waveguide to move in a second longitudinal direction opposite the first longitudinal direction and towards the second fork section and following the potential minimum/well above the diverging waveguide; and wherein the first section of the diverging waveguide further includes:

a second atomic state initialization section positioned between the laser cooling section and the second fork section, the second atomic state initialization section configured to initialize atomic states of at least the first group of the atoms moving in the second longitudinal direction following the potential minimum/well above the surface of the diverging waveguide to a second known ground-state configuration; and a second beam splitter section positioned between the second atomic state initialization section and the second fork section, the second beam splitter section configured to split a quantum mechanical wavefunction of each atom of the at least the second group of the atoms moving in the second longitudinal direction following the potential minimum/well above the surface of the diverging waveguide into a third portion having a third velocity and a fourth portion having a fourth velocity different than the third velocity, wherein the third portion travels into the third bifurcated end of the second fork section of the diverging waveguide and into the third loop end of the second loop section, and wherein the fourth portion travels into the fourth bifurcated end of the second fork section of the diverging waveguide and into the fourth loop end of the second loop section.

13. The atomic gyroscope of claim 10, further comprising:
a mirror positioned at the second end of the first section, the mirror configured to reflect light received at the second end of the first section back toward the first fork section and the first loop section.

14. The atomic gyroscope of claim 10, further comprising:

wherein the first beam splitter section is further configured as a recombination section for the at least the first group of the atoms returning from the first loop section back into the first section, the recombination section configured to recombine the first portion and the second portion into the quantum mechanical waveform for each atom of the at least the first group of the atoms; and wherein the first atomic state initialization section is further configured as a read-out section for the at least the first group of atoms returning from the first loop section in a second longitudinal direction opposite the first longitudinal direction toward the laser cooling section, wherein the read-out section is configured to read out light coming off the recombined quantum mechanical waveform of the at least the first group of the atoms, wherein the read-out section includes a photodetector configured to detect the light coming off the recombined the at least the first group of the atoms.

* * * * *